(12) United States Patent
Olsen

(10) Patent No.: US 8,550,654 B2
(45) Date of Patent: Oct. 8, 2013

(54) LIGHTING ASSEMBLIES AND DEVICES

(75) Inventor: Mark C. Olsen, Holladay, UT (US)

(73) Assignee: Safeseeker Inc., LLC, Holladay, UT (US)

( * ) Notice: Subject to any disclaimer, the term of this patent is extended or adjusted under 35 U.S.C. 154(b) by 433 days.

(21) Appl. No.: 13/020,182

(22) Filed: Feb. 3, 2011

(65) Prior Publication Data
US 2011/0194300 A1 Aug. 11, 2011

Related U.S. Application Data

(60) Provisional application No. 61/302,631, filed on Feb. 9, 2010, provisional application No. 61/310,412, filed on Mar. 4, 2010.

(51) Int. Cl.
*F21L 4/00* (2006.01)
(52) U.S. Cl.
USPC ........... 362/191; 362/102; 362/110; 362/119; 362/206; 362/398; 362/471
(58) Field of Classification Search
USPC ......... 362/102, 110, 119, 120, 190, 191, 398, 362/471
See application file for complete search history.

(56) References Cited

U.S. PATENT DOCUMENTS

| | | | |
|---|---|---|---|
| 5,060,123 A * | 10/1991 | Arnold | 362/102 |
| 5,126,927 A | 6/1992 | Reeves et al. | |
| 5,347,436 A | 9/1994 | Clyde et al. | |
| 6,386,726 B1 | 5/2002 | Macierowski et al. | |
| 6,419,371 B1 * | 7/2002 | McCalla et al. | 362/119 |
| 2007/0058364 A1 | 3/2007 | Britt | |
| 2008/0205037 A1 | 8/2008 | Griffin | |
| 2008/0305895 A1 | 12/2008 | Gant | |
| 2009/0002977 A1 | 1/2009 | Arnold, III | |
| 2009/0201621 A1 | 8/2009 | Abatemarco | |

OTHER PUBLICATIONS

International Search Report and Written Opinion for International Application No. PCT/US2011/023539 dated Apr. 1, 2011.

* cited by examiner

*Primary Examiner* — Stephen F Husar
(74) *Attorney, Agent, or Firm* — Dorsey & Whitney LLP

(57) ABSTRACT

A lighting assembly includes a receptacle having a bore, a lighting device having a light source, a retention mechanism, and a switch recessed within the bore of the receptacle. The retention mechanism may be configured to removably retain at least a portion of the lighting device within the bore of the receptacle. The switch may be configured to provide electrical energy to the light source in response to axial movement of at least a portion of the lighting device toward the base of the bore.

28 Claims, 10 Drawing Sheets

LIGHTING ASSEMBLIES AND DEVICES

CROSS-REFERENCE TO RELATED APPLICATIONS

This application claims the benefit of U.S. Provisional Patent Application No. 61/302,631, entitled "PERSONAL PROTECTION DEVICES THAT INCLUDE AN INTEGRATED LIGHTING DEVICE," filed Feb. 9, 2010, and U.S. Provisional Application No. 61/310,412, entitled "LIGHTING ASSEMBLY THAT INCLUDES AN INTEGRATED LIGHTING DEVICE," filed Mar. 4, 2010. The contents of each of the foregoing applications are incorporated herein, in their entirety, by this reference.

BACKGROUND

Conventional lighting devices or flashlights, while useful, are unsuitable or undesirable in certain circumstances. For instance, conventional flashlights make it difficult for a user to hold a flashlight while performing other activities such as self-defense or personal protection. In the area of personal protection, it is desirable for a user to readily hold, operate, and direct a flashlight while freeing up the same hand for other uses, such as for the control of a bat. In order to control both a bat and a flashlight in combination, a user is typically required to hold the flashlight in one hand while holding the bat in the other, thereby compromising the support and stability that is otherwise available in employing a bat with two hands. In addition, holding the flashlight in one hand while holding the bat in the other leaves the flashlight exposed and vulnerable to being knocked from the user's hand, inadvertently turned off, and/or broken.

In other situations it may be desirable for a user to illuminate areas where hard-wired or plug-in lighting is unavailable or becomes unavailable such as in a darkened storage unit, a car trunk, a remote cabin, a train, or an aircraft. In these situations and many others, conventional lighting devices or flashlights are often unsuitable and undesirable because they are frequently misplaced, not immediately available, make one or more hands of the user unavailable, and/or lack adequate means to effectively direct light output when not being held by the user.

SUMMARY

Embodiments of the invention are directed to lighting assemblies that include an integrated lighting device and such lighting devices. The disclosed lighting assemblies enable a user to conveniently control the operation of a lighting device even though the switch of the lighting device is protected and recessed in, for example, a handle portion of the personal protection device (e.g., a baseball bat or baton), a firearm, a building wall, a helmet, a backpack strap, a glove, a cockpit panel, a trunk of a vehicle, a hat, a sweat band, a goggle or goggle frame, a motorcycle (e.g., a motorcycle frame or handlebar), a bicycle (e.g., a bicycle frame or handlebar), and many other structures.

In an embodiment, a lighting assembly may include a receptacle having a first surface and bore formed therein. The bore may extend inwardly from the first surface of the receptacle toward a base. A lighting device may have a head portion and a base portion. The base portion of the lighting device may be at least partially received in the bore of the receptacle. The lighting device includes a light source operable to output light away from the head portion and the first surface of the receptacle. A retention mechanism may be configured to removably retain at least part of the lighting device within the bore of the receptacle. A switch may be electrically coupled to the light source and recessed within the bore of the receptacle. The switch may be configured to enable electrical energy to be provided to the light source from a power supply in response to axial movement of at least portion of the lighting device toward the base of the bore.

In an embodiment, a lighting device may include a housing having a first end and a second end. A light source may be mounted within the housing. The light source may be operable to emit light. An optical element may be attached to the housing and positioned to receive the light from the light source. A power supply may be disposed within the housing. A switch assembly may be mounted within the housing and be configured to enable electrical energy to be provided to the light source from the power supply. A controller may be operably coupled to the light source. The controller may be configured to control operation of the light source. A retention assembly may be movably coupled within the housing. The retention assembly may be configured to actuate the switch assembly in response to relative axial movement between the retention assembly and the housing.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Figure 1:
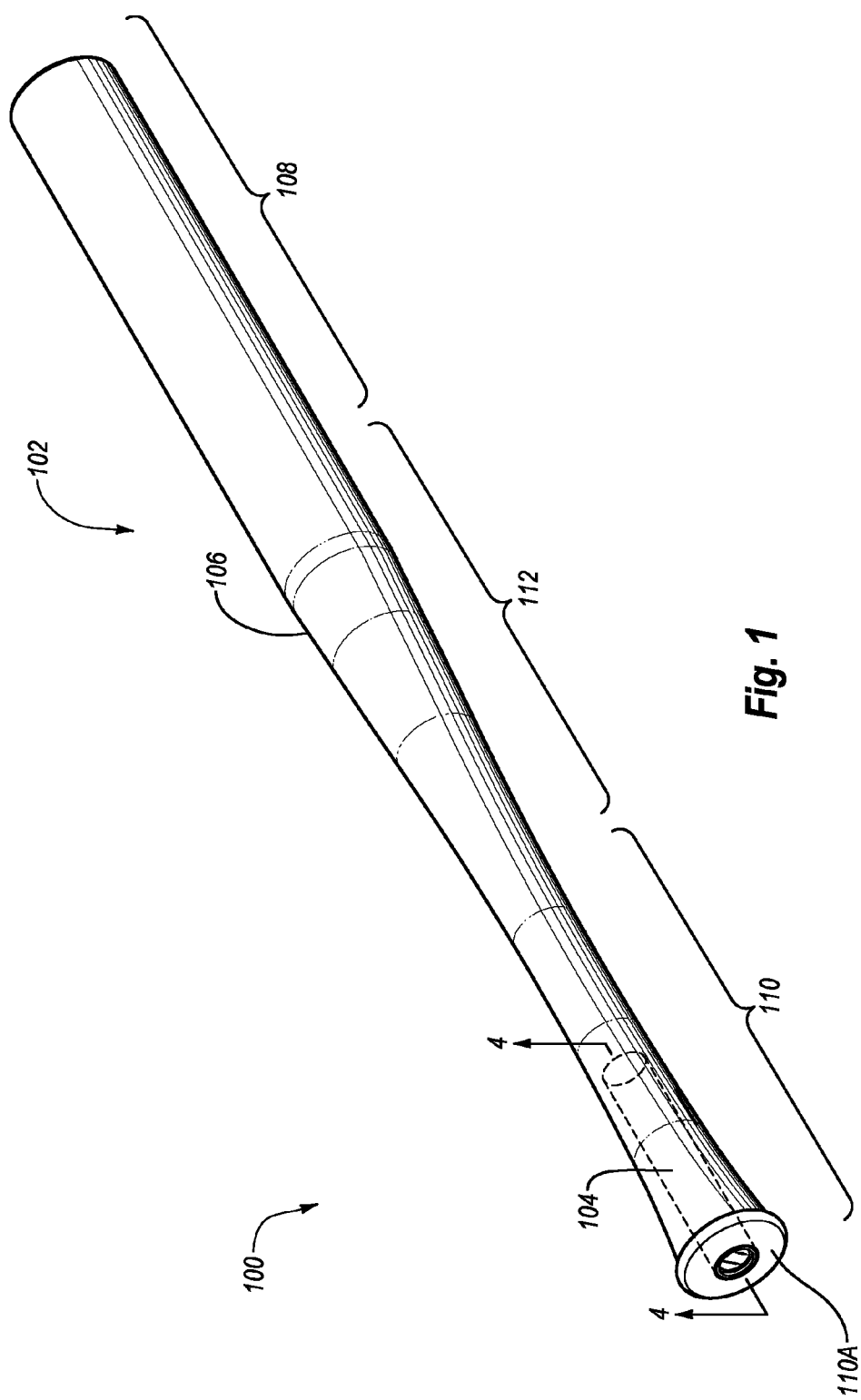
FIG. 1 is an isometric view of a lighting assembly configured in a bat according to an embodiment.

FIG. 1 is an isometric view of an embodiment of a lighting assembly 100 including a receptacle that forms part of a baseball bat 102 and a lighting device 104 (shown in phantom) disposed therein. The baseball bat 102 may include an elongated body 106 having a striking portion 108, a handle portion 110 adapted to be manually grasped by a user, and an intermediate portion 112 extending therebetween. The lighting device 104 (shown in phantom) may be integrated within the handle portion 110 of the baseball bat 102. As shown, the lighting device 104 may be at least partially disposed in a bore 114 (shown in FIG. 4) formed in at least the handle portion 110 of the elongated body 106. As will be described in more detail below, the bore 114 may be sized and shaped to receive and selectively house the lighting device 104 within the handle portion 110 of the baseball bat 102. While the cross-sectional shape of the bore 114 is shown as circular, the bore 114 may be squared or any other shape suitable to receive and house the lighting device 104 within the handle portion 110 of the baseball bat 102. The lighting device 104 may be configured to direct light output away from the handle portion 110 of the baseball bat 102. Such a configuration may provide a user the capability to quickly and precisely spotlight locations and/or potential threats to the user while maintaining both of the user's hands on the handle portion 110 of the baseball bat 102.

The baseball bat 102 may be fabricated from a number of different materials, such as wood, a plastic (e.g., polypropylene), a metallic material (e.g., an aluminum alloy, iron alloy, or titanium), or combinations of the foregoing materials. For example, the baseball bat 102 may be made from wood that has been distressed to provide an antique-like appearance. A typical length for the baseball bat 102 may be about 24 inches to about 36 inches and may weigh about 16 ounces to about 32 ounces.

Figure 2:
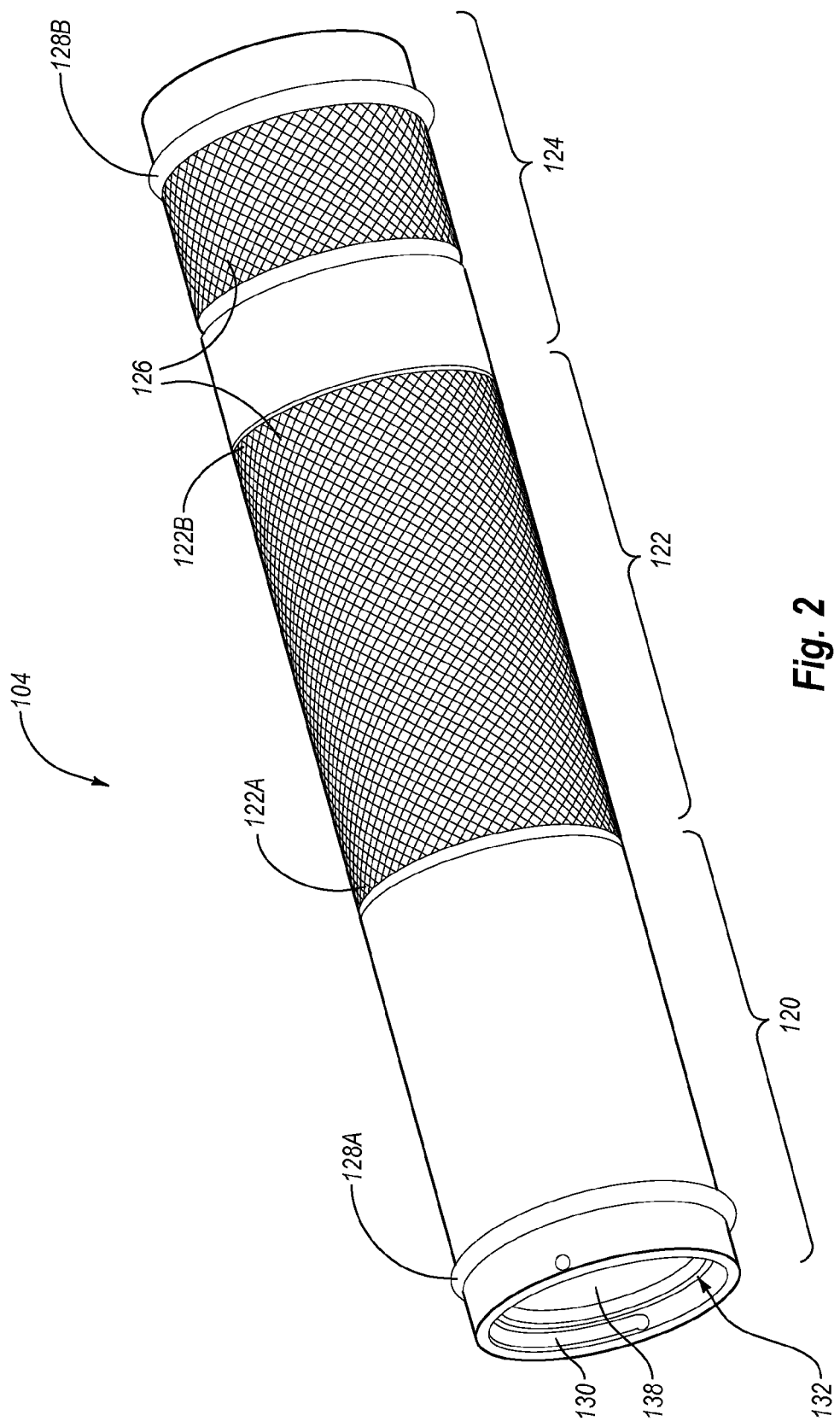
FIG. 2 is an enlarged isometric view of a lighting device of the lighting assembly shown in FIG. 1.

Referring now to FIG. 2 which is an enlarged isometric view of the lighting device 104 removed from the baseball bat 102 according to an embodiment. The lighting device 104 may include a main housing comprising a head portion 120, a barrel portion 122, and a base portion 124. The head portion 120 may be attached to a first end 122A of the barrel portion 122. The base portion 124 may be attached to a second end 122B of the barrel portion 122. While the main housing is shown having a substantially circular cross-sectional shape, the main housing may have a cross-sectional shape that is squared, rectangular, triangular, oval, or any other shape suitable to house the components of the lighting device 104.

The barrel portion 122 may include a grip 126 concentrically surrounding at least a portion of the barrel portion 122. As shown, the grip 126 may include a textured or non-slip surface formed on an exterior surface of the barrel portion 122 to improve a user's grip on the lighting device 104. Although a textured grip is shown, the grip 126 may comprise any means suitable to improve a user's grip on the lighting device 104, including without limitation, a rubber grip, a plastic grip, a neoprene grip, an ergonomically shaped barrel portion 122, or the like. Furthermore, in other embodiments, the grip 126 may be omitted. The barrel portion 122 may be made of metal, plastic, rubber, or any other material suitable to form part of the main housing.

The head portion 120 may be coupled to the first end 122A of the barrel portion 122. A friction element or bumper band 128A may be positioned on the head portion 120. The bumper band 128A may comprise a rubber annular ring and be disposed partially in a circular groove formed in an outer surface of the head portion 120. The bumper band 128A may be configured to reduce lateral movement of the lighting device 104 within the bore 114 (shown in FIG. 4) of the baseball bat 102 by contacting an inner surface of the bore 114. The bumper band 128A may also be configured to help a user grip the lighting device 104. The bumper band 128A may comprise rubber, plastic, metal, a combination thereof, any other material suitable to create a friction, or another type of fit between the bore 114 of the baseball bat 102 and the lighting device 104.

Figure 3:
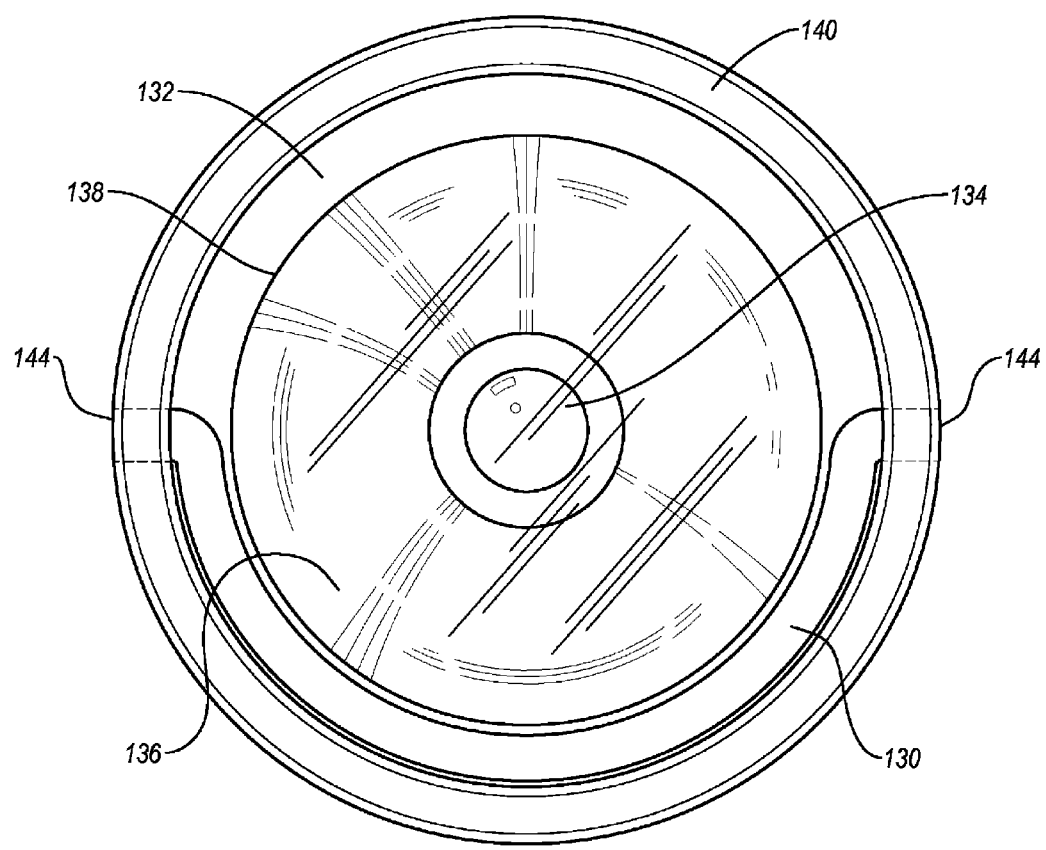
FIG. 3 is an enlarged end elevation view of an end of the lighting device shown in FIG. 2.

FIG. 3 is an enlarged end elevation view of an end of the head portion 120 shown in FIG. 2. As shown in FIG. 3, the end of the head portion 120 may include a rim 140, a handle member 130, a retention member 132, a light source 134, a reflective element 136, and an optical element or lens 138. The light source 134, the reflective element 136, and the optical element 138 will be discussed in more detail with reference to FIG. 4. As shown in FIGS. 2 and 3, the retention member 132 may comprise an annular ring and be located within the end of the head portion 120. In one embodiment, the retention member 132 may be integrally formed in the end of the head portion 120. The retention member 132 may be configured to overlap a portion of the optical element 138 such that the optical element 138 is retained within the head portion 120.

As shown in FIGS. 2 and 3, the handle member 130 may be rotatably attached to the head portion 120 between the retention member 132 and the rim 140. The handle member 130 may comprise a half circle D-ring having mounting extensions that extend through opposing apertures 144 formed in an outer wall of the head portion 120. While the shape of the handle member 130 is shown comprising a half-circle, a quarter-circle, a v-shape, a u-shape, a square, or any other shape suitable to provide a handle to a user is possible. The handle member 130 may articulate between a first position wherein the handle member 130 is positioned substantially flat on the retention member 132 and a second position wherein the handle member 130 is rotated away from the retention member 132. In the second position, a user can insert his or her finger or other object through the handle member 130 to pull the lighting device 104 out of the bore 114 or hold the lighting device 104. As shown, the curvature and width of the handle member 130 may correspond to the curvature and width of retention member 132 such that when the handle member 130 is the first position, the handle member 130 will not substantially obstruct the optical element 138.

Referring now to FIG. 2, the base portion 124 may be coupled to the second end 122B of the barrel portion 122. A second bumper band 128B may be disposed partially in an annular groove (shown in FIG. 4) formed in an outer surface of the base portion 124. The second bumper band 128B may comprise a rubber ring or one or more elongate strips. The base portion 124 may also include the grip 126 formed on the outer surface. As shown, the grip 126 may concentrically surround a portion of the outer surface of the base portion 124. The base portion 124 may also include a permanent magnet 146 (shown in FIG. 4) that is configured to be magnetically coupled with a ferromagnetic element 148 (shown in FIG. 4) located within the bore 114.

While the bumper band 128A and the second bumper band 128B are shown located on the head portion 120 and the base portion 124, they may be located on any section of the barrel portion 122, the head portion 120, the base portion 124, or may not be included at all on the lighting device 104. Moreover, the grip 126 may be located on any section of the barrel portion 122, the head portion 120, the base portion 124, or not be included on the lighting device 104 at all.

Figure 4:
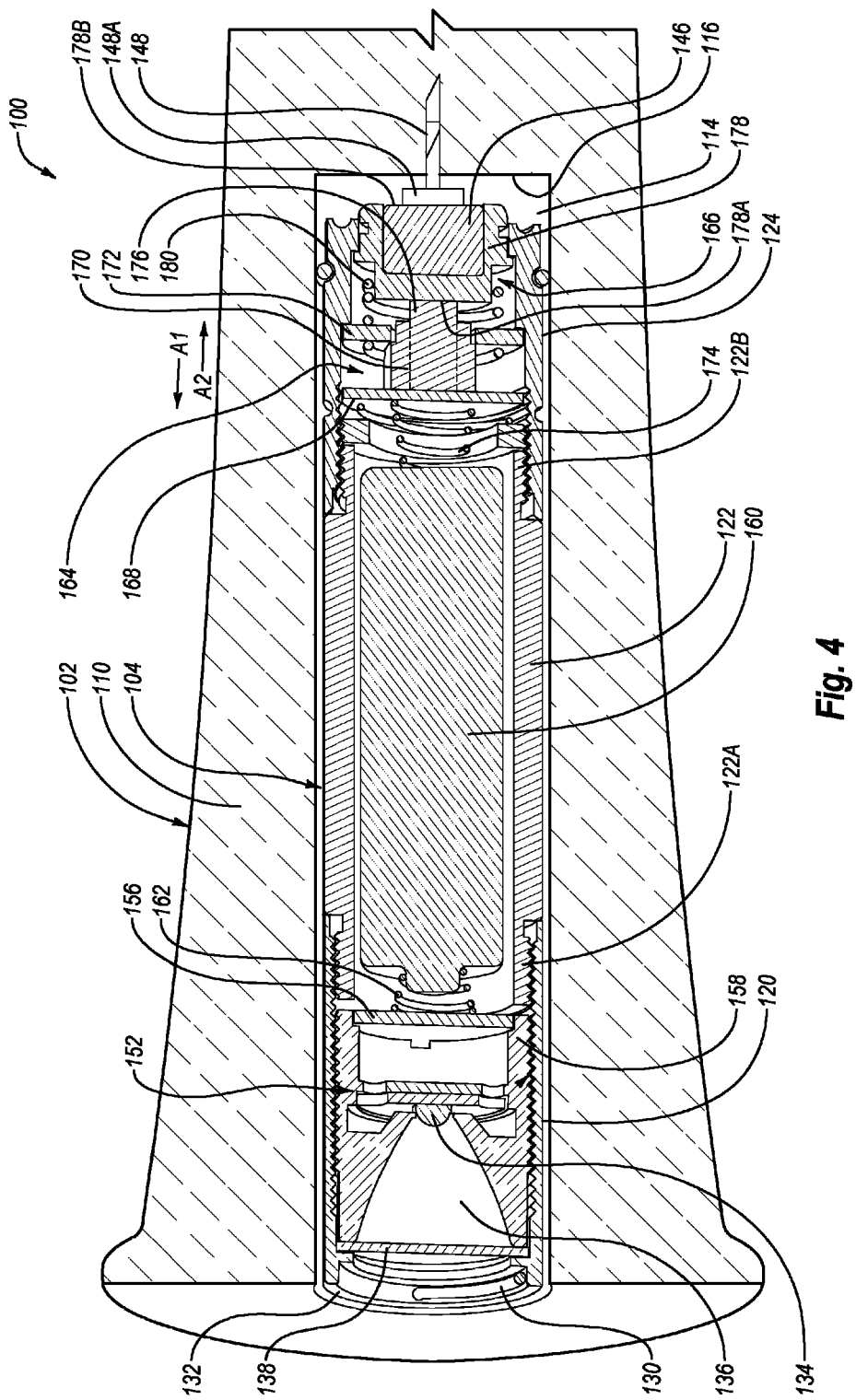
FIG. 4 is an enlarged cross-sectional view of the lighting assembly shown in FIG. 1 taken along line 4-4 of FIG. 1 to show the lighting device and the bore in more detail.

FIG. 4 illustrates an enlarged cross-sectional view of the lighting device 104 disposed in the bore 114 of the baseball bat 102 taken along section 4-4 of FIG. 1. Generally, the first end 122A and the second end 122B of the barrel portion 122 may be sized and configured to be received within the head portion 120 and the base portion 124, respectively. In the illustrated embodiment, the first end 122A and the second end 122B of the barrel portion 122 may include an exterior threaded portion. The head portion 120 may include an interior threaded portion. The base portion 124 may include also include an interior threaded portion. The interior threaded portions of the head portion 120 and the base portion 124 threadly engage the exterior threaded portions of the barrel portion 122. The base portion 124 may be attached to the barrel portion 122 in a similar manner. While threads are shown, the head portion 120 and the base portion 124 may be attached to the barrel portion 122 through any suitable means, including, clamps, seals, and the like. In addition, either the head portion 120 and/or the base portion 124 may be permanently attached to the barrel portion 122. More specific features of the lighting device 104 will now be described.

As shown in FIG. 4, the head portion 120 may include a tubular lighting frame 152 at least partially disposed within the head portion 120. The tubular lighting frame 152 may include an exterior threaded portion that threadly engages the interior threaded portion of the head portion 120. This allows a user to insert and/or remove the tubular lighting frame 152 from the head portion 120 by rotating the tubular lighting frame 152 relative to the head portion 120. In other embodiments, the tubular lighting frame 152 may be attached to the head portion 120 and/or barrel portion 122 by a slip fit, a compression fit, a screw, a weld, a magnet, or any other means suitable to attach the tubular lighting frame 152 to the lighting device 104. The tubular lighting frame 152 may be formed of a conductive material such as aluminum, a non-conductive material, or a combination thereof.

The light source 134 may be mounted on a light support member formed in the tubular lighting frame 152. The light source 134 may be positioned such that light output therefrom is directed away from the head portion 120 of the lighting device 104 and/or the handle portion 110 of the baseball bat 102. The light source 134 may be any suitable light source, such as one or more light emitting diodes, operable to emit light having an intensity of about 100 lumens per Watt to about 200 lumens per Watt (e.g., about 140-145 lumens per Watt). The light source 134 may also be a high density discharge bulb having an intensity of about 250 lumens per Watt or an incandescent bulb. In the illustrated embodiment, the light source 134 is a light emitting diode microchip. The light source 134 may produce white light, blue light, red light, or any other desired color.

The tubular lighting frame 152 may be configured to support the reflective element 136 adjacent the light source 134. The reflective element 136 may located within a reflective element cavity formed in the tubular light frame 152. The reflective element 136 may comprise a cone reflector, which may be configured to direct light from the light source 134 away from the head portion 120. While the cone reflector is shown, a parabolic reflector, a triangular reflector, or any other shaped reflector suitable to direct light way away from the head portion 120 is possible. The reflective element 136 may be made of any suitable light-reflecting material such as silver, aluminum, or the like. The reflective element 136 may also be formed from a plastic with one or more layers of a light-reflective material. Moreover, while the reflective element 136 is shown having a smooth surface, the reflective element 136 may include textured surface configured to optimize light efficiency and/or uniformity of a light beam. In other embodiments, the reflective element 136 may be omitted. For example, the light source 134 may be positioned approximately where the optical element 138 is now located.

As illustrated in FIG. 4, the optical element 138 may be positioned between the retention member 132 on the head portion 120 and an end of the tubular lighting frame 152. The optical element 138 may be a generally planar crystal. In other embodiments, the optical element 138 may be a polycarbonate plastic. The optical element 138 may also be configured to be an optical filter or include optical power to focus the light output from the light source 134. For example, the optical element 138 may be convex, aspheric, spherical or any other shape suitable to focus light. The optical element 138 may be either permanently attached to the head portion 120 or be removable from the head portion 120. In the case of a removable optical element 138, the optical element 138 may be removed from the lighting device 104 by unthreading the tubular lighting frame 152 from the head portion 120. In the case of a permanently attached optical element 138, the optical element 138 may be sealed to the retention member 132 with an adhesive.

A controller or circuit chip 156 may be seated in the tubular light frame 152 aft the light source 134. The controller 156 may be operably coupled to the light source 134 to control the operation thereof. The controller 156 may be a programmable controller including processing electronics. For example, the controller 156 may include programmable gate arrays and/or firmware that may be programmed to control the manner in which the light source 134 outputs light. For example, the controller 156 may be programmed to turn the light source 134 off after a predetermined amount of time. The controller 156 may also be programmed to alternate the color of light emitted from the light source 134. In addition, the may be programmed to pulse the light emitted from the light source 134.

The barrel portion 122 of the lighting device 104 may house a power supply 160. The power supply 160 may be electrically coupled to the light source 134 via the controller 156. As shown, a coil 162 may be configured to form a connection between the power supply 160 and controller 156. In the illustrated embodiment, the power supply 160 may comprise a 1.5 volt size "AA" battery. However, any number of batteries of various types, sizes and power may be employed for powering the light source 134, such as button cells, alkaline batteries, lithium batteries, rechargeable NiHM batteries, NiCd batteries, lithium ion batteries and the like.

Still referring to FIG. 4, the base portion 124 of the lighting device 104 may include a switch assembly housing 164 and a retention assembly 166. The switch assembly housing 164 may be disposed within the base portion 124 and include a contact plate 168, a switch assembly 170, and a retention support plate 172. The retention support plate 172 may be attached to the interior surface of the base portion 124. The contact plate 168 may be attached to the interior surface of the base portion 124 adjacent to the retention support plate 172. A second coil 174 may be attached to the contact plate 168 that is configured to form an electrical connection between the contact plate 168 and the power supply 160 when biased against the power supply 160. The switch assembly 170 may be located between the contact plate 168 and the retention support plate 172. The switch assembly 170 may also be attached to the contact plate 168. Such a configuration conceals and protects the switch assembly 170 within the main housing of the lighting device 104. The switch assembly 170 may include a spring-loaded button 176, which may extend through an opening formed in the retention support plate 172. The switch assembly 170 may be configured such that when the spring-loaded button 176 is depressed, the spring-loaded button 176 establishes electrical contact between the second coil 174 and the power supply 160 so that the electrical circuit between the power supply 160, the light source 134, and the controller 156 is closed. The main housing (i.e., the head portion 120, the barrel portion 122, and the base portion 124) may form part of the electrical circuit or an electrical wire extending between the switch assembly 170, the controller 156, and/or the light source 134 may form part of the electrical circuit. While the switch assembly 170 is shown as a push-button switch, a rocker switch, a micro-switch, an inline switch, or any other switch suitable to close the circuit is possible.

As shown, the retention assembly 166 may be located within the base portion 124. The retention assembly 166 may include a retention frame 178, a resilient member 180, and the permanent magnet 146. The retention frame 178 may include a base 178A and an open ended top 178B. The retention frame 178 may be movably coupled to the interior surface of the base portion 124 so that the retention frame 178 may move axially within the base portion 124 in directions A1 and A2. Moving in the direction A1 relative to the switch assembly 170, the base 178A of the retention frame 178 may depress the spring-loaded button 176 of the switch assembly 170. Moving in the direction A2 relative to the switch assembly 170, the base 178A of the frame may disengage from the spring-loaded button 176. A resilient member 180 may be attached to the retention support plate 172 and bias the base 178A of the retention frame 178 away from the spring-loaded button 176. The interior surface of the base portion 124 may be configured to retain the retention frame 178 within the base portion 124. In the illustrated embodiment, a portion of the retention frame 178 may project from an end of the base portion 124. In other embodiments, the retention frame 178 may be recessed within the end of the base portion 124.

The permanent magnet 146 may be mounted within a seat formed in the retention frame 178. The permanent magnet 146 may be a strong rare earth magnetic such as neodymium or another suitable magnetic. In the illustrated embodiment, the permanent magnet 146 is mounted such that the permanent magnet 146 is flush with the open ended top 178B of the retention frame 178. However, other configurations may be employed, without limitation. The permanent magnet 146 may be mounted within the seat by a magnetic force, an adhesive, a weld, or any other means suitable to secure the permanent magnet 146 within the seat.

As illustrated in FIG. 4, the ferromagnetic element 148 may be attached to the base 116 of the bore 114. The ferromagnetic element 148 may be a steel screw having a head 148A. In one embodiment, the ferromagnetic element 148 may be threaded through the base 116 of the bore 114 so that a position of the head 148A within the bore 114 may be adjusted to control the extent to which the head portion 120 of the lighting device 104 projects from an end of the handle portion 110 of the baseball bat 102. While a steel screw is shown, other suitable ferromagnetic elements are possible such as a steel nail, a steel plate, or the like.

The ferromagnetic element 148 and the permanent magnet 146 may be magnetically coupled to each other so that the lighting device 104 is removably secured at least partially within the bore 114 of the baseball bat 102. The strength of the magnetic attractive force between the ferromagnetic element 148 and the permanent magnet 146 may be sufficiently strong so that the lighting device 104 remains secured within the bore 114 when the baseball bat 102 is used to strike objects, such as an assailant or other object. However, the strength of the magnetic attractive force between the ferromagnetic element 148 and the permanent magnet 146 may be weak enough such that the lighting device 104 may conveniently be removed from the bore 114 by pulling on the handle member 130 attached to the head portion 120 of the lighting device 104. In other embodiments, a user may remove the lighting device 104 from the bore 114 by holding the baseball bat 102 oriented with the end pointed downwardly and hitting the opposing end of the striking portion 108 (shown in FIG. 1) in a downward fashion.

Operation of the lighting assembly 100 will now be described. To turn the lighting device 104 on, a user may press against the optical element 138 to cause the retention assembly 166 to move relative to the switch assembly housing 164 in the direction A1. Movement of the retention assembly 166 in the direction A1 relative to the switch assembly housing 164 may cause the base 178A of the retention frame 178 to depress the spring-loaded button 176 to close the electrical circuit between the light source 134, the controller 156, and the power supply 160. In other words, the head portion 120, the barrel portion 122, the switch assembly 170, and base portion 124 are displaced within the bore 114 in the direction A2 so that the spring-loaded button 176 is depressed against the base 178A of the retention frame 178 thereby closing the electrical circuit. In other embodiments, the spring-loaded button 176 may bias an electrical contact (not shown) against the contact plate 168, which is electrically coupled to the power supply 160, which is electrically coupled to the controller 156 and the light source 134. In other embodiments, the power supply 160 may be held in an electrical contact assembly (not shown) that moves axial in direction A1 when the spring-loaded button 176 is depressed so that the circuit between the power supply 160 and the light source 134 and controller 142 is closed. With electrical contact established and the electrical circuit closed, the lighting device 104 may output light.

The lighting device 104 may be turned off in the same manner by which it is turned on. Namely, the user may press against the optical element 138 to move the retention assembly 166 relative to the switch assembly housing 164 in the direction A1 to bias the spring-loaded button 176 against the base 178A of the retention frame 178 wherein the electrical circuit may open.

In other embodiments, the controller 156 may include sensing circuitry that enables the user to control various operational characteristics and/or modes of the light source 134. For example, the sensing circuitry may sense when the spring-loaded button 176 is depressed for a certain period of time. Responsive to the sensing circuitry sensing a predetermined time period, the intensity of the light output from the light source 134 may continuously increase until a maximum intensity is reached or continuously decrease until the light source 134 is turned off. When the user releases pressure on the optical element 138 and consequently the spring-loaded button 176, the controller 156 may maintain the selected power level at which the light is output from the light source 134. In other embodiments, when the spring-loaded button 176 is depressed rapidly two or more times, the controller 156 may operate the light source 134 in an "SOS mode," such as three long flashes of light followed by three short flashes of light. In other embodiments, with or without the sensing circuitry, when the spring-loaded button 176 is depressed rapidly two or more times, the controller 156 may operate the light source 134 to rapidly flash erratically. Such a configuration may allow a user to visually stun a potential assailant with the lighting assembly 100.

Thus, the operation of the lighting device 104 may be conveniently controlled by the user by biasing the lighting device 104 into the bore 114 of the baseball bat 102 despite the switch assembly 170 of the lighting device 104 being hidden and inaccessible to the user.

Figure 5:
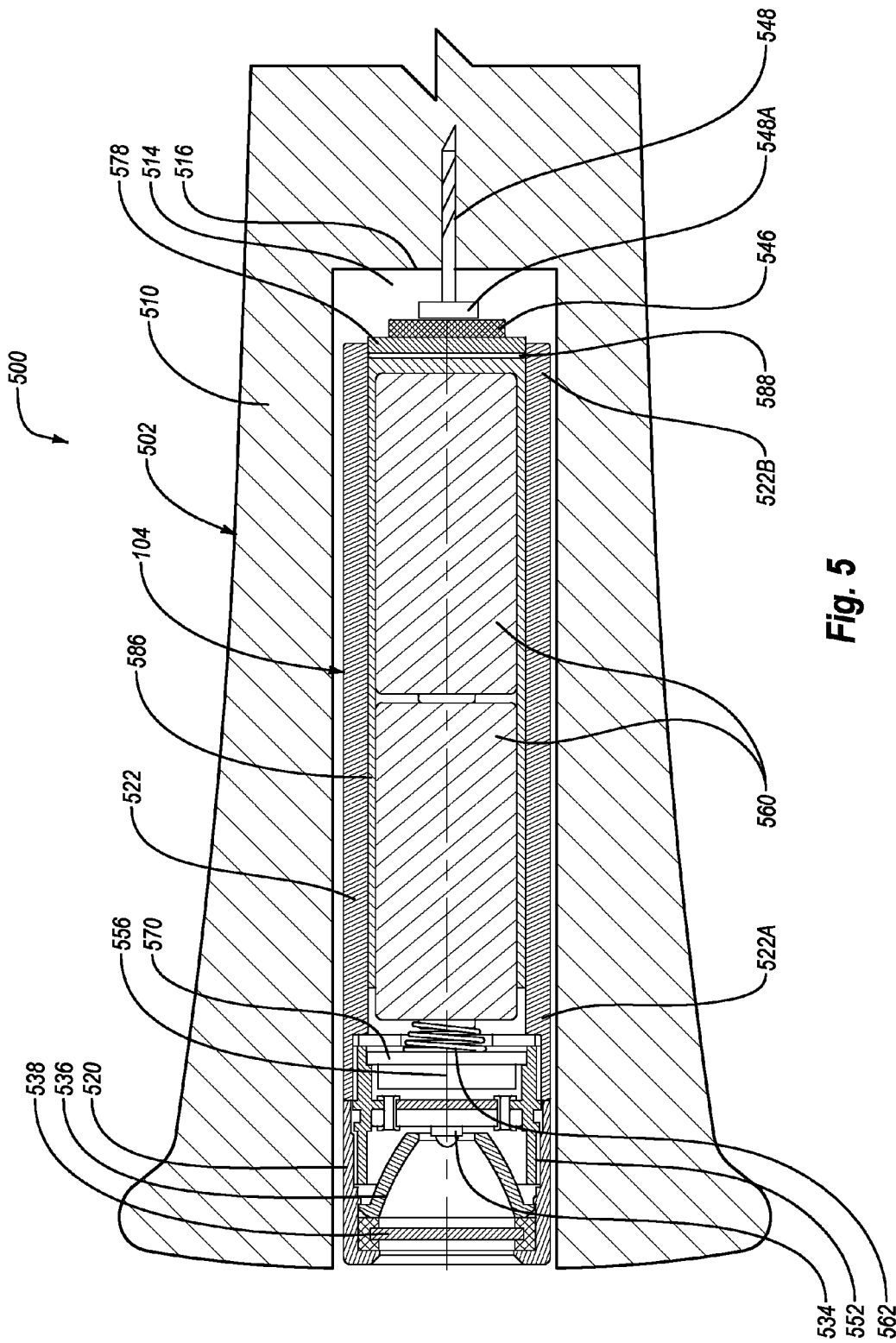
FIG. 5 is an enlarged cross-sectional view of a lighting assembly including a lighting device according to an embodiment.

Reference is now made to FIG. 5 which illustrates an enlarged cross-sectional view a lighting assembly 500 including a receptacle that forms part of a baseball bat 502 and a lighting device 504 according to an embodiment. The lighting assembly 500 may be similar in many respects to the lighting assembly 100 previously described above in FIGS. 1-4. To the extent features or components of this configuration function in a manner similar to that as described above, such disclosure is hereby incorporated into the following additional configuration. Like structures and/or components are given like reference numerals.

As shown in FIG. 5, the lighting assembly 500 may include the baseball bat 502 and the lighting device 504. The baseball bat 502 may include a handle portion 510 having a bore 514 formed therein. The bore 514 may be partially defined by a base 516 within the handle portion. A ferromagnetic element 548 may be mounted to the base 516. The ferromagnetic element 548 may have a head 548A and may comprise a steel nail, a steel screw, a magnet, or any other means suitable to form permanent magnets. As discussed above with respect to FIG. 4, the degree to which the ferromagnetic element 548 extends from the base 516 may be adjustable. The bore 514 may be sized, shaped, and configured to receive the lighting device 504.

The lighting device 504 may disposed in the bore 514. In the illustrated embodiment, the lighting device 504 is completely disposed within the bore 514. In other embodiments, a portion of the lighting device 504 may extend from an end of the bore 514. The lighting device 504 may include a main housing having a head portion 520 and a barrel portion 522. The barrel portion 522 may have a first end 522A and a second end 522B. The head portion 520 may be attached to the first end 522A of the barrel portion 522. A tubular lighting frame 552 may be mounted within the head portion 520 and the first end 522A of the barrel portion 522. As shown, the head portion 520 may be configured to house a substantial portion of the tubular lighting frame 552. A switch assembly 570 may be mounted to the tubular lighting frame 552. Such a configuration conceals and protects the switch assembly 570 within the main housing of the lighting device 504. As discussed with reference to the switch assembly 170, the switch assembly 570 may be a push-button switch, a rocker switch, a micro-switch, an inline switch, or any other switch suitable to close the circuit. A light source 534 may be mounted on a light support member formed on the tubular lighting frame 552. The light source 534 may comprise one or more light emitting diodes, high density discharge bulbs, incandescent bulbs, or any other lighting means. A controller 556 may be mounted in the tubular lighting frame 552 between the switch assembly 570 and the light source 534. The switch assembly 570, the light source 534, and the controller 556 may be operatively connected. A reflective element 536 may be positioned within the tubular light frame 552 adjacent to the light source 534. An optical element 538 may be mounted on the tubular lighting frame 552 in front of the reflective element 536.

Referring still to FIG. 5, the barrel portion 522 may include a power supply case 586 that holds a power supply 560. The power supply case 586 may be moveable within an interior of the barrel portion 522 and have an open end nearest the switch assembly 570. The power supply case 586 may be an electrically conductive material, such as aluminum or an aluminum alloy. As shown, a coil 562 may be positioned between the switch assembly 570 and the power supply 560. A retention member 578 may be movably attached to the power supply case 586 proximate to the base 516 of the bore 514. A permanent magnet 546 may be affixed to the retention member 578. The retention member 578 may comprise a plate or any other structure suitable to support the permanent magnet 546. A seal element 588 may be disposed within the second end 522B of the barrel portion 522 between the retention member 578 and the power supply case 586. The seal element 588 may be a rubber ring, a gasket, a sealant, or any other means suitable to at least partially seal the power supply 560 and other components from moisture and other environmental conditions.

The lighting device 504 may be turned on by a user pressing against the optical element 538 to axially displace the head portion 520, the tubular light frame 552 (including the switch assembly 570), and the barrel portion 522 relative to the power supply case 586 (including the power supply 560) and the retention member 578. This axial displacement may cause the power supply 560 or the coil 562 to push on the switch assembly 570 thereby actuating the switch assembly 570. Once the switch assembly 570 is actuated, the switch assembly 570 may close the electrical circuit between the power supply 560, the controller 556, and the light source 534 so that the light source 534 may output light.

The lighting device 504 may be turned off in the same manner by which it is turn on. Namely, the user may press against the optical element 538 to move the switch assembly 570 relative to the power supply case 586 to actuate the switch assembly 570 wherein the electrical circuit may open.

As with the lighting device 104 shown in FIGS. 1-4, various operational characteristics (e.g., intensity of the light and operational mode) may be controlled by sensing circuitry in the controller 556 and the number of times and/or duration that the user compresses the switch assembly 570 between the power supply 560 and the controller 556. For example, responsive to the sensing circuitry sensing a predetermined time period when the switch assembly 570 is engaged with the power supply case 586, the color of the light output from the light 534 may transition from a white light to an alternating red, blue, and white light. In other embodiments, the sensing circuitry or the controller 556 may include a piezoelectric transducer that is configured to produce an audible alarm. Accordingly, a user may use the lighting device 504 as a safety light, panic device, or a siren. In another example, the sensing circuitry may sense inactivity of the lighting assembly 500 and deactivate the light source 534 after a predetermined amount of time.

Figure 6:
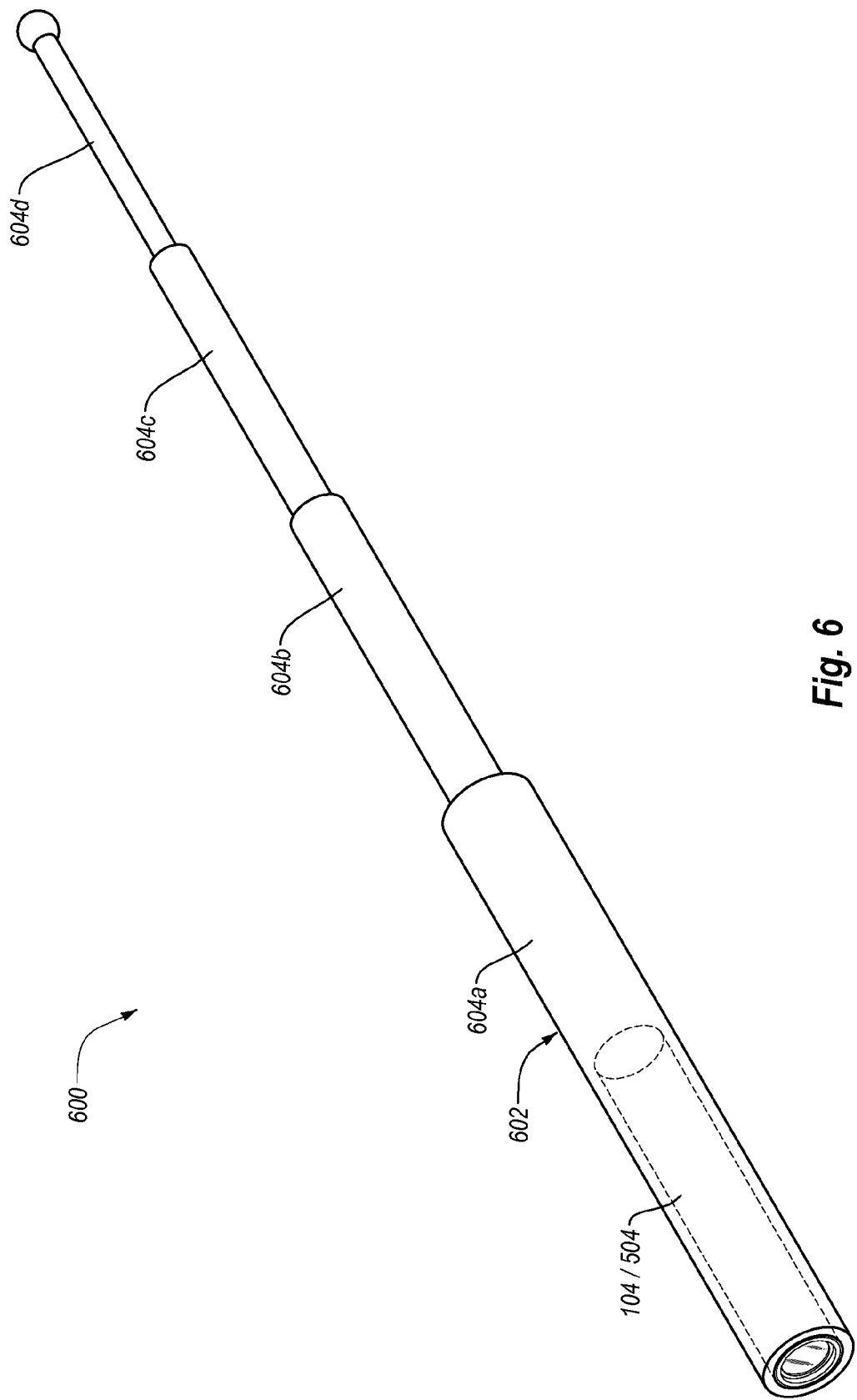
FIG. 6 is an isometric view of a lighting assembly configured as a telescoping baton having a lighting device shown in phantom according to an embodiment.

In addition to the lighting assembly 100 and the lighting assembly 500, a number of other lighting assemblies are possible. For example, a lighting assembly may include the combination of a lighting device and a receptacle in the form of bores formed in other personal defense articles. For example, FIG. 6 is an isometric view of a lighting assembly 600 integrated into a telescoping baton 602. The lighting assembly 600 may be suitable for police and/or military use. Referring to FIG. 6, the lighting assembly 600 comprises the lighting devices 104 or 504 shown in phantom integrated within the telescoping baton 602 having a bore (not shown). The telescoping baton 602 may include a plurality of telescoping tubular shaft sections 604a-604d. The shafts 604c and/or 604d may function as a striking portion for the telescoping baton 602. The lighting device 104 or 504 may be mounted at least partially within the shaft section 604a in the bore (not shown) in a similar manner as illustrated in FIGS. 4 and 5 for the baseball bats 102 or 502, the description of which is not repeated herein in the interest of brevity.

The shaft section 604b may nest in the shaft section 604a, the shaft section 604c may nest in the shaft section 604b, and the shaft section 604d may nest in the shaft section 604c. The shaft sections 604b-604d may be deployed by the user holding onto the shaft section 604a and aggressively shaking the nested assembly of shaft sections 604b-604d attached to the shaft section 604a to deploy them and configure the telescoping baton 602 in the illustrated deployed configuration. The shafts 604b-604d may be secured in the deployed configuration via a friction lock between the shafts 604a-604d or other suitable technique.

In addition to baseball bats and telescoping batons, the lighting assembly may comprise a lighting device in combination with a number of other personal defense articles, such as a Billy club, a non-telescoping baton of fixed length, or another suitable personal defense article.

Furthermore, other embodiments of the lighting assembly contemplate integrating the lighting device 104 or 504 with a number of other receptacles. For example, the lighting device 104 or 504 may be disposed in a bore or recess of a receptacle that forms at least part of a cane; a helmet; a backpack (e.g., a backpack strap); a glove; a hat; a sweat band; a goggle or goggle frame; a motorcycle (e.g., a motorcycle frame or handlebar); a bicycle (e.g., a bicycle frame or handlebar); a sled; skateboarding gear (e.g., skateboarding helmets, gloves, or skateboards); a wall in, for example, a boat, plane, or car; a storage container; a gun (e.g., a handgun, a riffle, or a shotgun); and many other applications.

Figure 7:
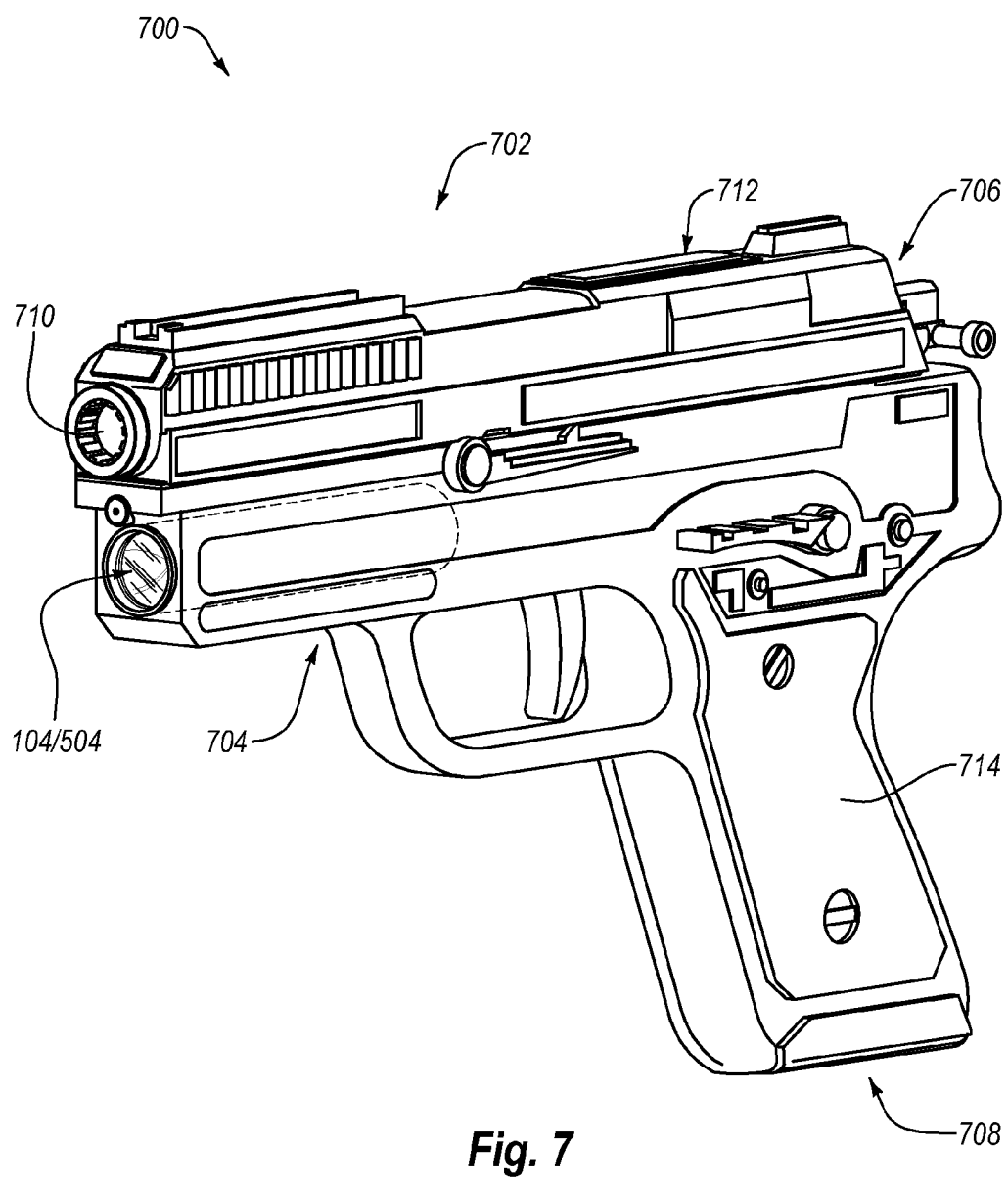
FIG. 7 is an isometric view of a handgun including a lighting assembly having a receptacle with a lighting device disposed therein shown in phantom according to an embodiment.

FIG. 7 is an isometric view of a lighting assembly 700 according to an embodiment. The lighting assembly 700 comprises the lighting device 104 or 504 shown in phantom integrated within a handgun 702 having a bore (not shown). As shown in FIG. 7, the handgun 702 may include a frame 704 and an action 706 configured for loading and firing projectiles. A magazine 708 may be integrated within the handgun 702. A barrel portion 710 may be attached to or integrated within the frame 704. The barrel portion 710 may be configured to receive and launch projectiles. Independent from the frame 704, housings 712 may be formed around various aspects of the handgun 702 to provide characteristic shapes, covers, shrouds, and the like. A handle or grip 714 may be attached to the frame 704. The grip 714 may be configured to support the handgun 702 in a hand of a user. As shown, the lighting device 104 or 504 may be mounted at least partially within the frame 704 in the bore below the barrel portion 710 in front of the grip 714. The lighting device 104 or 504 may mounted in a similar manner as illustrated in FIGS. 4 and 5 for the baseball bats 102 or 502, the which is not repeated herein in the interest of brevity. The bore may be formed in plastic, metal, or any other material suitable to form part of the handgun 702. In another embodiment, the lighting device 104 or 504 may be mounted at least partially within the housings 712 surrounding the barrel portion 710. The size and shape of the lighting device 104 or 504 may be configured to correspond to any given bore size, location, or shape. Although the handgun 702 is illustrated, a rifle, a pistol, or any other firearm suitable to receive the lighting device 104 or 504 within a bore is possible. A user may conveniently control the operation of a lighting device 104 or 504 even though the switch of the lighting device 104 or 504 is protected within the bore of the handgun 702. The lighting assembly 700 also allows the handgun user to spotlight a target area with the lighting device 104 or 504 while maintaining complete control of the handgun 702. In addition, the lighting assembly 700 provides a handgun user the ability to nonviolently subdue a target individual with intense flashes of light from the lighting device 104 or 504 while maintaining the handgun 702 drawn on the target individual.

Figure 8:
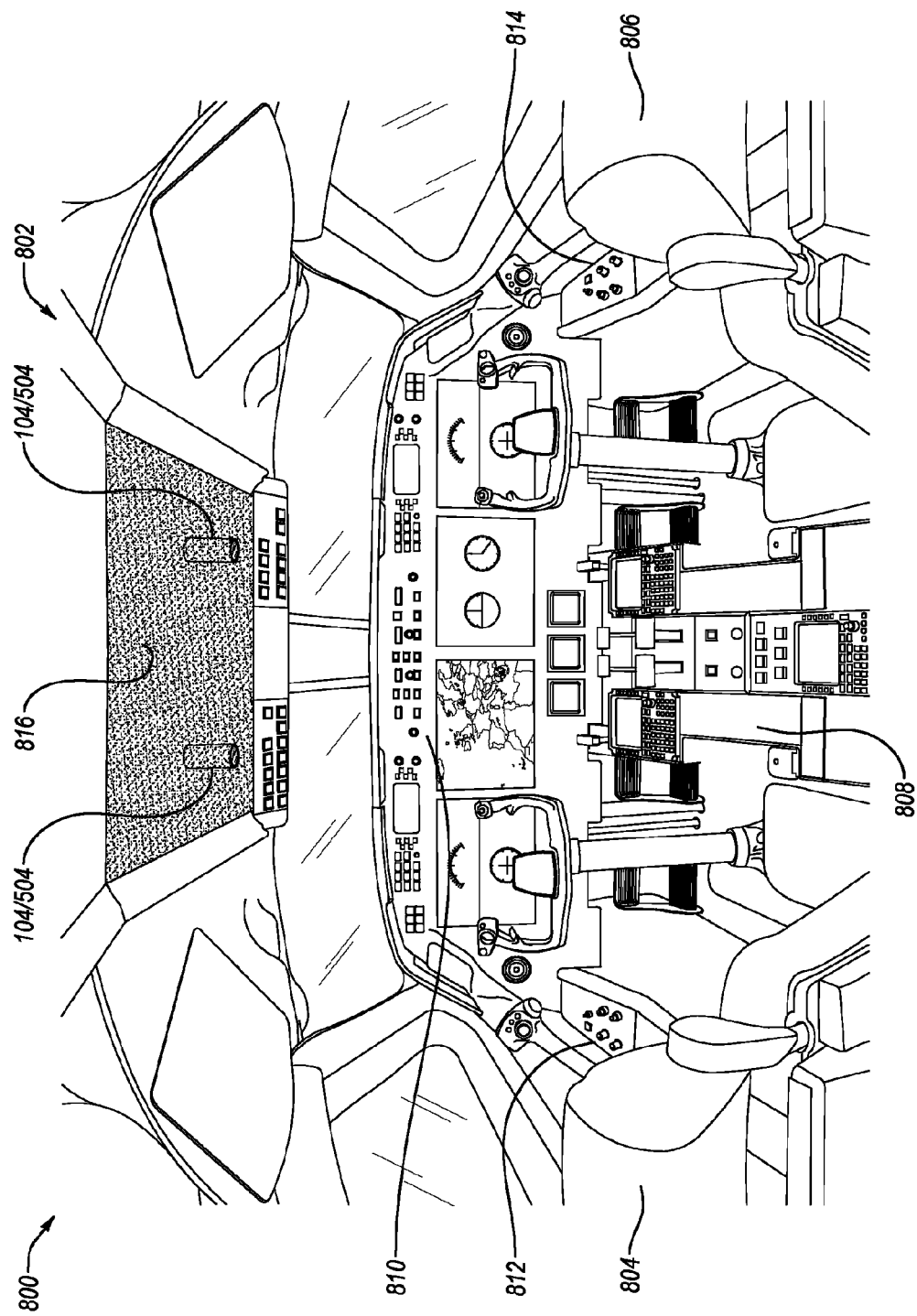
FIG. 8 is an isometric view of a lighting assembly including a receptacle forming part of a cockpit of an aircraft and a lighting device disposed therein shown in phantom according to an embodiment.

FIG. 8 is an isometric view of a lighting assembly 800 according to an embodiment. The lighting assembly 800 comprises the lighting devices 104 or 504 shown in phantom integrated within an aircraft cockpit 802 having one or more bores (not shown). As illustrated in FIG. 8, the cockpit 802 may include a captain's seat 804 and a first officer's seat 806. A pedestal 808 may be located between the captain's seat 804 and the first officer's seat 806. The pedestal 808 may include a throttle and other engine controls, input keyboards for a navigational system, and the like. A main instrument panel 810 may be located in front of the captain's seat 804 and the first officer's seat 806. The main instrument panel 810 may include important flight displays regarding performance and aircraft status. A first side console 812 may be located adjacent the captain's seat 804 opposite the pedestal 808. A second side console 814 may be located adjacent the first officer's seat 806 opposite the pedestal 808. The first side console 812 and the second side console 814 may include a side-stick, communication instruments, documentation, and the like. An overhead panel 816 may be located above the captain's seat 804 and the first officer's seat 806. The overhead panel 816 may include miscellaneous controls and features not directly involved in flying. As shown, one or more lighting devices 104 or 504 may be mounted at least partially within the overhead panel 816 in bores (not shown). The lighting devices 104 or 504 may be mounted in a similar manner as illustrated in FIGS. 4 and 5 for the baseball bats 102 or 502, which is not repeated herein for the sake of brevity. While the lighting device 104 or 504 is shown located in the overhead panel 816, the lighting device 104 or 504 may be located in the main instrument panel 810, the pedestal 808, the side consoles 812, 814, or any other structure within the cockpit 802. The magnetic strength of the permanent magnet 146 or 546 (shown in FIGS. 4 and 5) may be configured to be sufficiently strong such that the lighting device 104 or 504 remains in the bore during periods of air turbulence. Moreover, the magnetic strength of the permanent magnet 146 or 156 can be configured to be sufficiently weak such that a pilot can grab the handle member 130 (shown in FIG. 3) to remove the lighting device 104 or 504 from the bore as needed. Such a configuration provides a pilot convenient operation of the lighting device 104 or 504 by simply pressing the optical element of the lighting device 104 or 504 overhead. In addition, the lighting device 104 or 504 provides the pilot emergency lighting that can be operated independent of an auxiliary power supply of the aircraft. Furthermore, the pilot may remove the lighting device 104 or 504 from the overhead panel 816 illuminate other areas within the aircraft or outside of the aircraft.

Figure 9:
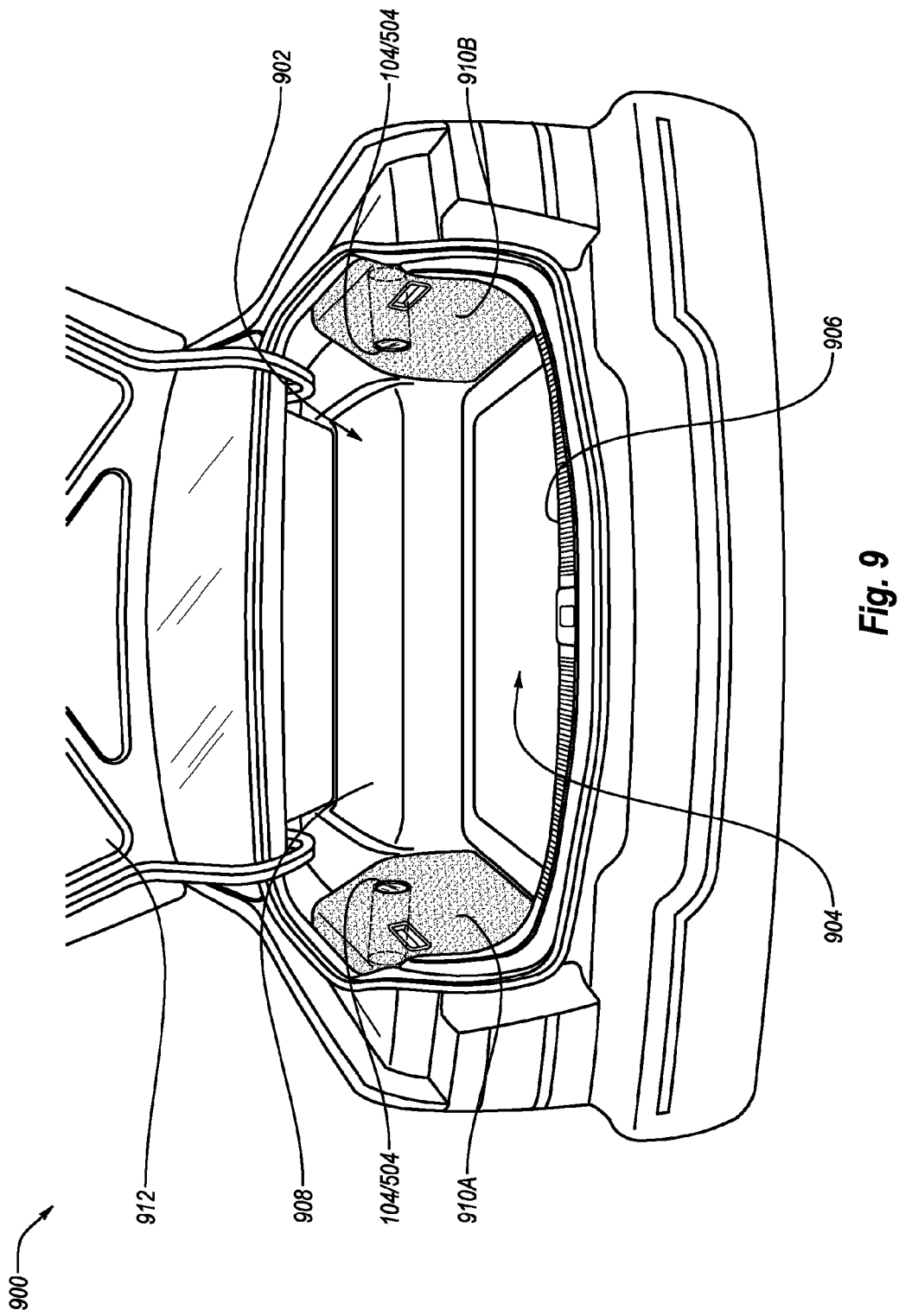
FIG. 9 is an isometric view of a lighting assembly including a receptacle forming part of a trunk of an automobile and a lighting device disposed therein shown in phantom according to an embodiment.

FIG. 9 is an isometric view of a lighting assembly 900 according to an embodiment. The lighting assembly 900 comprises the lighting device 104 or 504 shown in phantom integrated within an automobile trunk 902 having one or more bores (not shown). As shown in FIG. 9, the trunk 902 may include a bottom element 904, a rear wall 906, a front wall 908, sidewalls 910A, 910B, and a trunk lid 912 that opens upwardly as shown. As shown, one or more lighting devices 104 or 504 may be mounted at least partially within sidewalls 910A, 910B in bores (not shown). The lighting devices 104 or 504 may be mounted in a similar manner as illustrated in FIGS. 4 and 5 for the baseball bats 102 or 502, which is not repeated herein.

The lighting assembly 900 may provide a user needed light in a typically darkened trunk. Furthermore, the user may conveniently control the operation of the lighting device 104 or 504 even though the switch of the lighting device 104 or 504 is protected within the bore of the trunk 902. The user can simply press against the optical element of the lighting device 104 or 504 to illuminate the trunk. In addition, the user may continue to use the lighting device 104 or 504 when the automobile has a "dead battery." Moreover, in the case of an emergency or other event where the user may need to leave the automobile or examine other areas of the vehicle, the user may convert the lighting device 104 or 504 into a portable lighting device by manipulating the handle member 130 (shown in FIG. 3) to remove the lighting device 104 or 504 from the bore.

Figure 10:
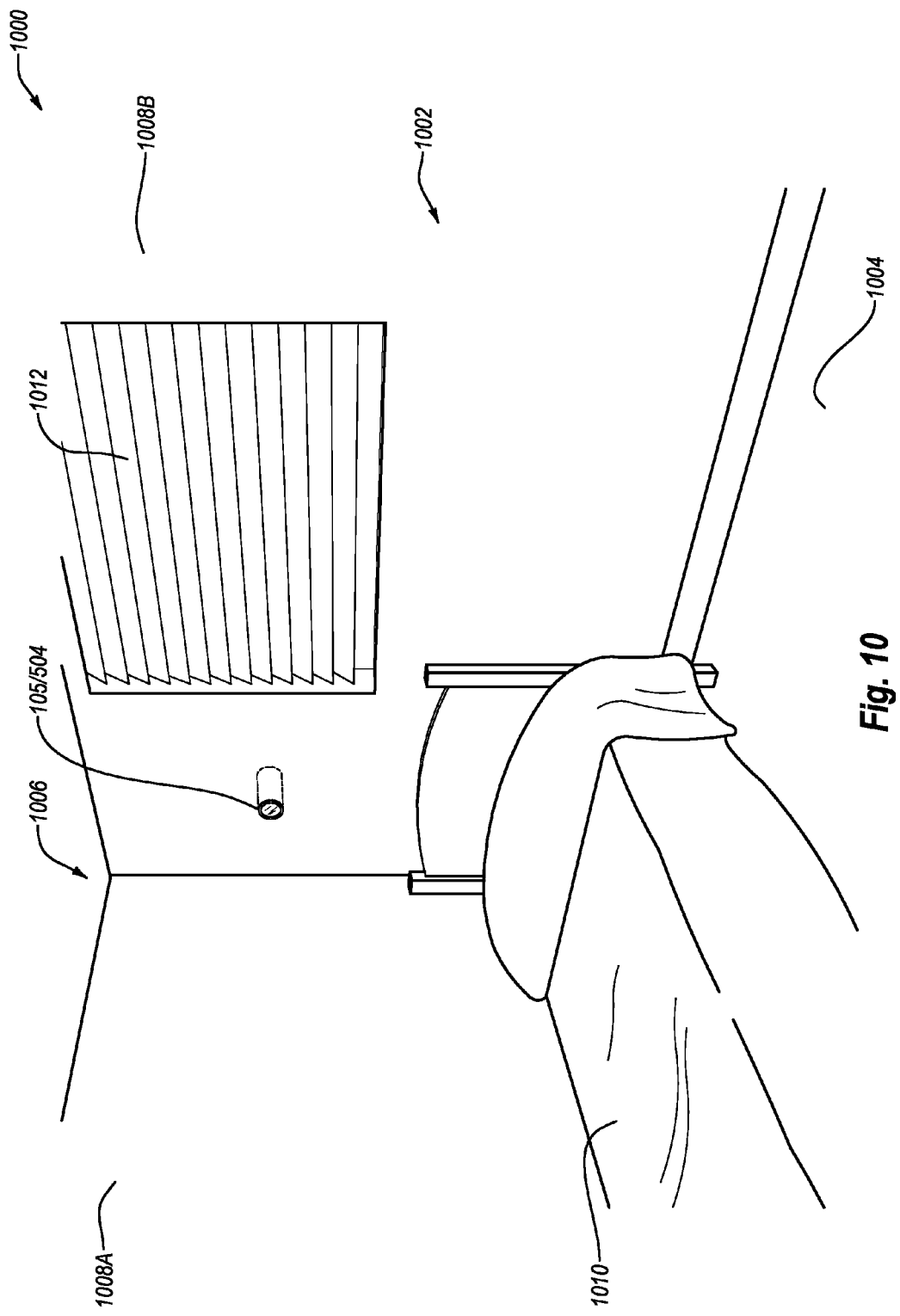
FIG. 10 is an isometric view of a lighting assembly including a receptacle comprising a room and a lighting device shown in phantom according to an embodiment.

FIG. 10 is an isometric view of a lighting assembly 1000 according to an embodiment. The lighting assembly 1000 comprises the lighting device 104 or 504 shown in phantom integrated within a room 1002 having a bore (not shown). Referring to FIG. 10, the room 1102 may include a floor area 1004 and a ceiling 1006 above the floor area 1004. Vertical walls 1008A, 1008B may extend between a perimeter of the floor area 1004 and the ceiling 1006. The vertical wall 1008B may have a window 1012. A bed 1010 having a side portion and a head portion may be positioned on the floor area 1004 having the side portion along the vertical wall 1008A and the head portion adjacent vertical wall 1008B. The room 1002 may be in a train, a cruise liner, a hotel, a home residence, or any area within a man-made structure. As shown, the lighting device 104 or 504 may be mounted at least partially within the vertical wall 1008B in a bore (not shown). The lighting device 104 or 504 may be mounted in a manner similar to that as illustrated in FIGS. 4 and 5 for the baseball bats 102 or 502, which is not repeated herein.

The lighting assembly 110 may provide a sleeping or relaxing user a convenient night light or reading light. The lighting assembly 1000 may also provide the user an emergency source of light that can be quickly accessed. Moreover, the user can convert the lighting device 104 or 504 to a portable lighting device by removing the lighting device 104 or 504 from the bore.

The lighting assemblies described may be employed in virtually any place a user might desire or need light in dark or darkened places, but does not want to be encumbered with an external switch or the mechanical challenges associated with a switch (e.g., required dexterity to actuate the switch or gear associated with a particular activity). The disclosed embodiments provide a lighting assembly configured so that the user may touch the optical element or lens of the lighting device to turn the lighting device on and/or change the mode of operation of the lighting device, as desired or needed.

While various aspects and embodiments have been disclosed herein, other aspects and embodiments are contemplated. The various aspects and embodiments disclosed herein are for purposes of illustration and are not intended to be limiting.

What is claimed is:

1. A lighting assembly, comprising:
   a receptacle having a first surface and a bore formed therein, the bore extending inwardly from the first surface of the receptacle toward a base;
   a lighting device having a head portion and base portion, the base portion of the lighting device being at least partially received in the bore of the receptacle, the lighting device further including a light source operable to output light away from the head portion and the first surface of the receptacle;
   a retention mechanism configured to removably retain at least part of the lighting device within the bore of the receptacle;
   a switch electrically coupled to the light source and recessed within the bore of receptacle, the switch being configured to enable electrical energy to be provided to the light source from a power supply in response to axial movement of the lighting device toward the base of the bore.

2. The lighting assembly of claim 1, wherein the retention mechanism removably retains the at least part of the lighting device within the bore of the receptacle via a magnetic force.

3. The lighting assembly of claim 1, wherein the base portion of the lighting device includes a permanent magnet, and wherein the receptacle further includes a ferromagnetic element mounted to the base of the bore, the permanent magnet and ferromagnetic element being configured to removably retain the at least part of the lighting device within the bore of the receptacle.

4. The lighting assembly of claim 3, wherein the ferromagnetic element is adjustably mounted to the base of the receptacle, the ferromagnetic element being configured to adjust a distance the lighting device projects from the first surface of the receptacle.

5. The lighting assembly of claim 1, wherein the receptacle forms at least part of a baseball bat.

6. The lighting assembly of claim 1, wherein the receptacle forms at least part of a firearm.

7. The lighting assembly of claim 1, wherein the receptacle forms at least part of a telescoping baton.

8. The lighting assembly of claim 1, wherein the receptacle forms part of a cockpit of an aircraft.

9. The lighting assembly of claim 1, wherein the lighting device includes a handle member mounted to the first end of the lighting device, the handle member being configured to assist a user in removing the lighting device from the bore of the receptacle.

10. The lighting assembly of claim 9, wherein the handle member comprises a substantially half circle D-ring.

11. The lighting assembly of claim 1, wherein the lighting device includes a controller operably coupled to the light source, the controller being configured to control operation of the light source.

12. The lighting assembly of claim 11, wherein the controller is configured to direct the light source to output light in varying intensities.

13. The lighting assembly of claim 11, wherein the controller is configured to direct the light source to output alternating colors of light.

14. The lighting assembly of claim 11, wherein the controller is configured to direct the light source to output repetitive flashes of light.

15. The lighting assembly of claim 11, wherein the controller is configured to direct the light source to output a first flash of light having a first duration of time followed by a second flash of light having a second duration, the second duration of time being longer than the first duration of time.

16. The lighting assembly of claim 11, wherein the controller includes sensing circuitry configured to sense inactivity of the lighting device.

17. A lighting device, comprising:
   a housing having a first end and a second end,
   a light source mounted within the housing, the light source being operable to output light;
   an optical element attached to the housing and positioned to receive the light from the light source;
   a power supply disposed within the housing;
   a switch assembly mounted within the housing, the switch assembly being configured to enable electrical energy to be provided to the light source from the power supply;
   a controller operably coupled to the light source, the controller being configured to control operation of the light source;

a retention assembly movably coupled within the housing, the retention assembly being configured to actuate the switch assembly in response to relative axial movement between the retention assembly and the housing.

18. The lighting device of claim 17, further comprising a handle member moveably attached to the first end of the housing, the handle member comprising a substantially half circle D-ring.

19. The lighting device of claim 17, wherein the retention assembly comprises a spring-loaded frame having a permanent magnet attached thereto.

20. The lighting device of claim 17, wherein biasing the optical element moves the housing relative to the retention assembly.

21. The lighting device of claim 19, wherein the permanent magnet comprises neodymium.

22. The lighting device of claim 17, further including a power supply case received and movable within the housing.

23. The lighting device of claim 22, wherein axial movement of the housing relative to the power supply case actuates the switch assembly.

24. The lighting device of claim 17, wherein the controller includes sensing circuitry, wherein the controller operates the light source in response to the sensing circuitry sensing a predetermined time period when the switch assembly is engaged with the power supply.

25. The lighting device of claim 17, wherein the controller is configured to direct the light source to output flashes of light.

26. The lighting device of claim 17, wherein the controller is configured to direct the light source to output alternating colors of light.

27. The lighting device of claim 17, further including one or more bumper bands disposed about the housing.

28. The lighting device of claim 17, wherein the controller includes one or more piezoelectric transducers configured to output sound.

* * * * *